No. 878,201. PATENTED FEB. 4, 1908.
R. H. GOLDSBOROUGH.
TURBINE.
APPLICATION FILED MAY 14, 1906.
3 SHEETS—SHEET 1.
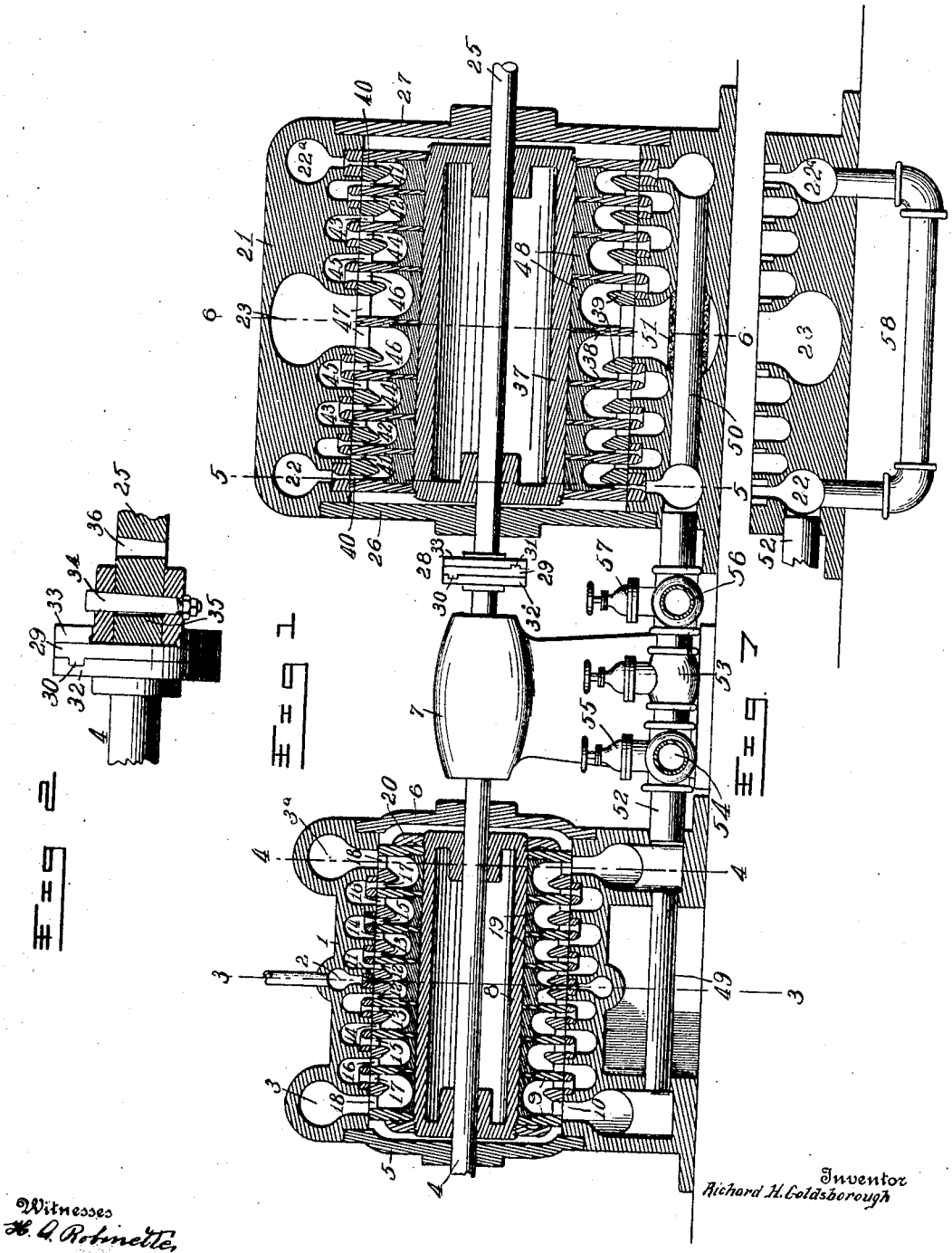
Witnesses
H. C. Robinette,
F. B. Rosenthal
Inventor
Richard H. Goldsborough
By G. Ayres.
Attorney No. 878,201. PATENTED FEB. 4, 1908.
R. H. GOLDSBOROUGH.
TURBINE.
APPLICATION FILED MAY 14, 1906.

3 SHEETS—SHEET 2.

Witnesses
H. E. Robinette
F. B. Rosenthal

Inventor
Richard H. Goldsborough

By G. Ayres
Attorney

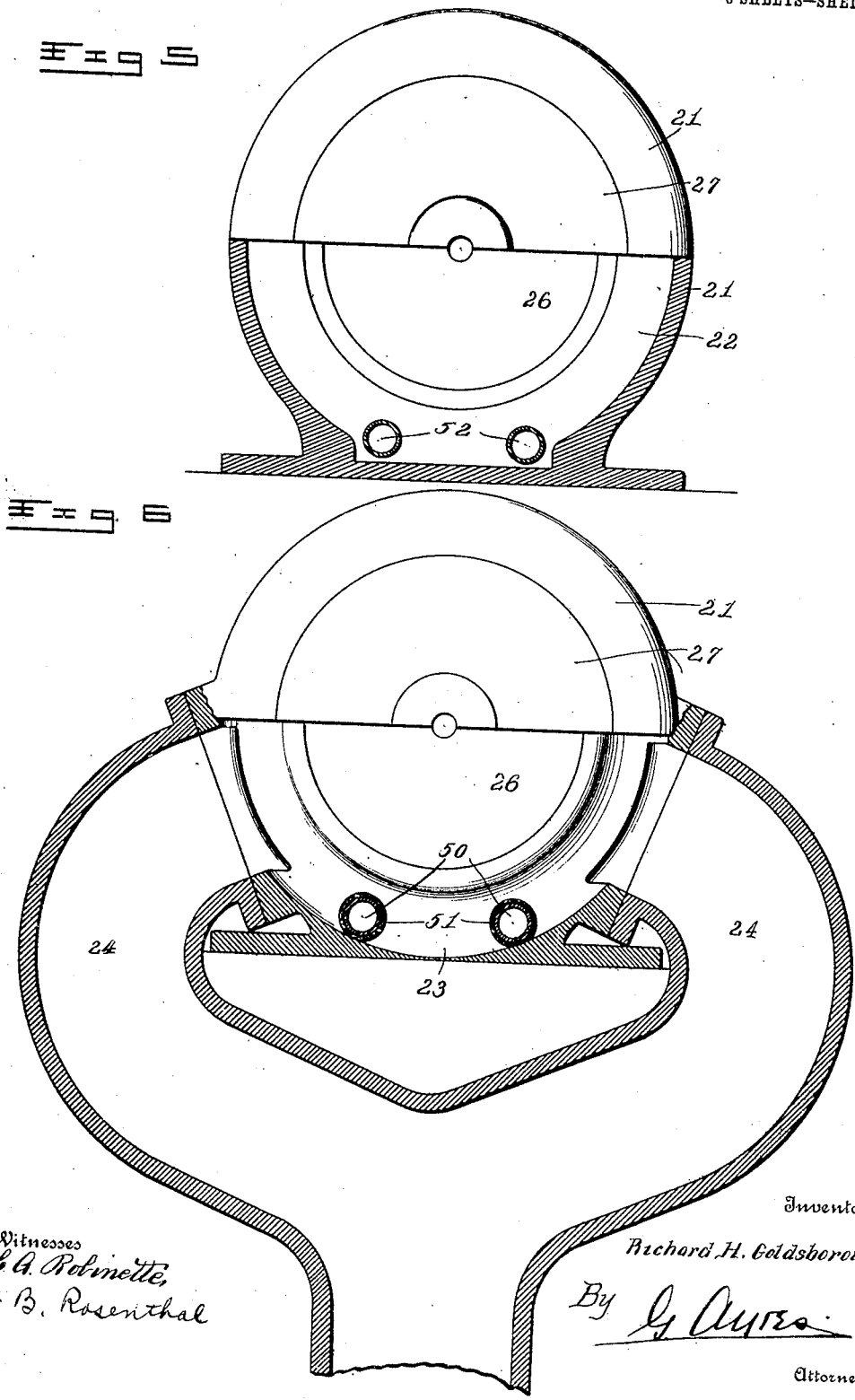

UNITED STATES PATENT OFFICE.

RICHARD H. GOLDSBOROUGH, OF WASHINGTON, DISTRICT OF COLUMBIA.

TURBINE.

No. 878,201.  Specification of Letters Patent.  Patented Feb. 4, 1908.

Application filed May 14, 1906. Serial No. 316,732.

*To all whom it may concern:*

Be it known that I, RICHARD H. GOLDSBOROUGH, a citizen of the United States, residing at Washington, in the District of Columbia, have invented certain new and useful Improvements in Turbines, of which the following is a specification.

My invention relates to an improvement in turbines, and it consists in the constructions, combinations and arrangements herein described and claimed.

An object of my invention is to provide an improved compound turbine system comprising independent turbine units, which shall be free from any tendency of leakage to or from the turbine casings about the rotor shafts extending therethrough; thereby avoiding the expenditure of power and practical difficulties inherent in existing turbine constructions employing sealing devices for preventing leakage about the rotor shaft.

A further object of my invention is to provide a compound turbine system, in which the several turbine units can be conveniently adjusted, and any of said units can be operated independently of the others.

Figure 3:
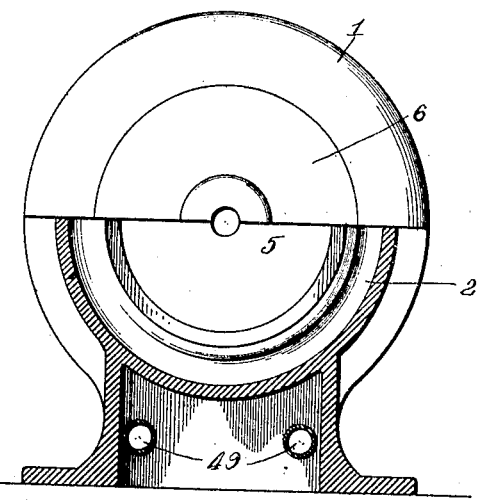
Figure 4:
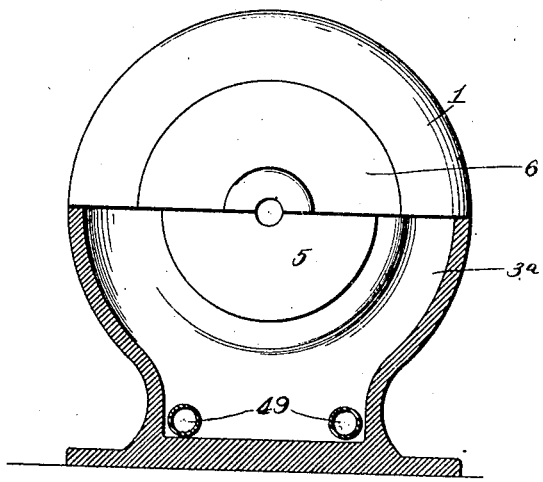

In the accompanying drawings, forming a part of this application and in which similar reference symbols indicate corresponding parts in the several views: Figure 1 is a vertical axial sectional view, partially in elevation, illustrating one embodiment of my invention consisting of a primary and a secondary turbine unit; Fig. 2 is a detail sectional view, on a larger scale, illustrating a preferred form of coupling connection between two rotors; Fig. 3 is a sectional view, on the line 3—3 of Fig. 1, with the rotor omitted for clearly disclosing the structure of the casing; Fig. 4 is a similar view, on the line 4—4 of Fig. 1; Fig. 5 is a similar view, on the line 5—5 of Fig. 1; Fig. 6 is a similar view, on the line 6—6 of Fig. 1, and Fig. 7 is a detail sectional view, illustrating a modification of the construction shown in Fig. 1.

Referring to the drawings, 1 indicates the primary turbine casing, provided with a medial annular initial steam chamber 2 and with two end annular exhaust chambers 3 and 3ª.

A shaft 4, extending through the heads 5 and 6 of the casing, is provided at each end with any usual external bearings, such as 7.

The shaft carries a rotor comprising a drum 8 provided with a plurality of annular members 9 and outer rings 10, between which are securely held medial annular series of initial vanes 11 and two laterally arranged series of rotor vanes 12, 13, 14, 15, 16, 17 and 18. Annular spacing members 19 are positioned between the successive annular members 9, and nuts 20 are threaded on the ends of the drum for securely clamping the several parts in position thereon.

The secondary turbine casing 21 is provided with two end annular admission chambers 22 and 22ª and with a medial annular exhaust chamber 23, which latter discharges through branch conduits 24 to a condenser, or other suitable point.

A shaft 25, extending through the heads 26 and 27 of the casing, may be provided with any usual external bearings, and is connected to the rotor shaft 4 by a detachable and automatically adjustable coupling 28. I have shown such coupling consisting of a free disk 29 provided with diametrical flanges 30 and 31 on its opposites sides; said flanges being arranged at right angles to each other and slidably engaging diametrical recesses in disks 32 and 33, secured, respectively, to the shafts 4 and 25. The disk 33 is shown slidably mounted on the shaft 25 and secured thereto by a key 34 extending through a slot 35 in said shaft. As shown especially in Fig. 2, the shaft 25 is provided with a second slot 36 for receiving the key 34 to securely lock the disk 33 in place when the latter has been withdrawn along the shaft for releasing the coupling 28.

From the above description, it will be clear that the coupling provides a rigid, or non-elastic, connection between the rotor shafts, capable of being quickly and conveniently detached for disconnecting the two rotor shafts, and constructed to permit sufficient axial variation between the two shafts to allow for independent adjustment of the two turbine units.

The shaft 25 carries a rotor comprising a drum 37 provided with a plurality of annular members 38 and outer rings 29, between which are securely held two sets of rotor vanes 40, 41, 42, 43, 44, 45, 46 and 47. Annular spacing members 48 are positioned between the successive annular members 38; and the several parts are secured in any suitable manner, as by threading the two end annular members on the drum.

The primary turbine casing is provided with suitable means, such as the pipes 49, for maintaining its two end annular exhaust chambers 3 and 3ª in free communication.

The secondary turbine casing 21 is similarly provided with suitable means, such as pipes 50, for maintaining free communication between its two end annular admission chambers 22 and 22ª; said pipes being shown provided with a jacket of heat non-conducting material 51 where they extend through the lower portion of the annular exhaust chamber 23.

A conduit 52, connecting the exhaust chamber 3ª with the adjacent admission chamber 22, provides means for establishing free communication between the two exhaust chambers 3, 3ª and the two admission chambers 22, 22ª; the conduit being provided with a gate valve 53 for closing the connection between said exhaust chambers and admission chambers.

A branch pipe 54, provided with a valve 55, communicates with the conduit 52 at a point between said valve 53 and the primary turbine casing, and leads to a condenser, or other suitable point for exhaust. A similar branch pipe 56, provided with a valve 57, communicates with the conduit 52 at a point between its valve 53 and the secondary turbine casing; said branch pipe 56 leading to any suitable source of steam supply for the secondary turbine, such as a boiler or the exhaust of an independent motor.

In the operation of my invention, steam is maintained at any desired pressure within the initial annular steam chest 2, from which it is directed through the initial annular series of vanes 11 and directed laterally in both directions through the two lateral series of rotor vanes 12, 13, 14, 15, 16, 17 and 18. These series of vanes are constructed and proportioned to provide for a sufficient expansion of the steam during its passage therethrough to cause its exhaust at substantially atmospheric pressure from the two final series of vanes 18 into the primary annular exhaust chambers 3 and 3ª at the end of the turbine casing. This construction maintains a steam pressure at substantially atmospheric pressure within the exhaust chambers, and minimizes the tendency of the steam to leak from such chambers past the end of the rotor. Further, any slight leakage which might occur past the end of the rotor would be at atmospheric pressure, and there would be no escape of steam outward from the casing, or leakage of air thereinto, about the rotor shaft. The valve 53 being open and the valves 55 and 57 closed, the conduit 52 conducts the steam at substantially atmospheric pressure from the primary exhaust chambers 3 and 3ª to the admission chambers 22 and 22ª of the secondary turbine. The steam being maintained in said admission chambers at substantially atmospheric pressure, minimizes the tendency of leakage from said chambers past the end of the rotor and prevents leakage about the rotor shaft. The steam is directed from each admission chamber through the adjacent series of vanes 40, 41, 42, 43, 44, 45, 46 and 47. The final series of vanes 47 of the two sets are arranged to discharge into a common annular exhaust chamber 23, from which the exhaust is discharged through branch conduits 24 to a condenser, or other suitable point.

From the above description, it will be seen that my invention provides an improved construction free from any tendency of leakage to or from the turbine casings about the rotor shafts extending therethrough; thereby avoiding the losses and practical difficulties accompanying the employment of sealing devices, and enabling an efficient degree of condenser vacuum to be maintained without danger of leakage of air or steam under pressure thereinto.

Where it is desired to increase the power output of the system, the valve 53 is closed and the valves 55 and 57 opened. In this position of the parts, the exhaust from the primary turbine is conducted to a suitable point by the branch pipe 54, and live steam is admitted to the secondary turbine by the branch pipe 56. Further, this position of the parts enables either one of the turbine units to be independently actuated by disconnecting the clutch 28, and admitting steam only to the active unit, leaving the idle unit cut off.

Fig. 7 illustrates a slight modification of the secondary turbine casing, in which the annular admission chambers 22 and 22ª thereof are maintained in free communication by a connecting pipe 58 exterior to the casing. This modified construction avoids the passage of the connecting pipe through the final exhaust chamber 23, as shown in my preferred construction in Fig. 1.

I have illustrated and described my invention applied to a radial-flow type of turbine, but, obviously, it could be adapted to an axial-flow turbine, and changes could be made within the spirit and scope of my invention.

Having thus described my invention, what I claim as new and desire to secure by Letters Patent, is:—

1. A compound turbine system constituting a series of independent units, each unit comprising a casing and a rotor, and means for conducting the exhaust from one unit to both ends of the casing of the succeeding unit of said series, substantially as described.

2. A compound turbine system constituting a series of independent units, the primary unit of said series comprising a rotor and a casing provided with an exhaust chamber at each end, each secondary unit comprising a rotor and a casing provided with admission chambers at each end, and connections from the exhaust chambers of each unit to the admission chambers of the succeeding unit of the series, substantially as described.

3. A compound turbine system constituting a primary unit and a secondary unit, each of said units comprising a casing and rotor, said primary unit constructed with a medial admission chambers and with exhaust chambers at each end of its casing, said secondary unit constructed with admission chambers at each end of its casing, and means connecting the primary exhaust chambers with the secondary admission chambers, substantially as described.

4. A compound turbine system constituting a primary unit and a secondary unit, each of said units comprising a casing and rotor, said primary unit constructed with exhaust chambers at each end of its casing, said secondary unit constructed with admission chambers at each end of its casing, and means for establishing free communication between said several exhaust chambers and admission chambers, substantially as described.

5. A compound turbine system constituting a primary unit and a secondary unit, each of said units comprising a casing and rotor, said primary unit constructed with exhaust chambers at each end of its casing, means for maintaining said exhaust chambers in free communication, said secondary unit constructed with admission chambers at each end of its casing, and means connecting the primary exhaust chambers with the secondary admission chambers, substantially as described.

6. A compound turbine system constituting a primary unit and a secondary unit, each of said units comprising a casing and rotor, said primary unit constructed with exhaust chambers at each end of its casing arranged in communication with one another, said secondary unit constructed with admission chambers at each end of its casing arranged in communication with one another, and means connecting the primary exhaust chambers with the secondary admission chambers, substantially as described.

7. A compound turbine system constituting a primary unit and a secondary unit, each of said units comprising a casing and rotor, said primary unit constructed with exhaust chambers at each end of its casing, said secondary unit constructed with admission chambers at each end of its casing, a conduit connecting the primary exhaust chambers with the secondary admission chambers, an exhaust branch and an admission branch to said conduit, and valves in said conduit and branches to provide for independent actuation of either of said units, substantially as described.

In testimony whereof I affix my signature in presence of two witnesses.

RICHARD H. GOLDSBOROUGH.

Witnesses:
ALEX. S. STEUART,
G. AYERS.